United States Patent
Zielnicki (10) Patent No.: US 7,298,607 B2
(45) Date of Patent: Nov. 20, 2007

(54) METHOD AND APPARATUS FOR REINFORCING A CHASSIS

(75) Inventor: Steven Zielnicki, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 121 days.

(21) Appl. No.: 11/238,388

(22) Filed: Sep. 29, 2005

(65) Prior Publication Data

US 2007/0070587 A1    Mar. 29, 2007

(51) Int. Cl.
*G01F 1/16* (2006.01)

(52) U.S. Cl. ............ 361/679; 361/729; 361/752; 312/223.2; 312/223.3; 174/520; 174/532

(58) Field of Classification Search ............ 361/679, 361/727–728, 736, 752, 741, 756, 724, 729; 211/26, 26.2, 190–192, 134, 151, 157, 188; 312/223.1, 223.2, 223.3, 348.1, 348.2, 257.1, 312/265.1, 265.2

See application file for complete search history.

(56) References Cited

U.S. PATENT DOCUMENTS

| 5,978,232 | A | 11/1999 | Jo |
| 6,362,968 | B1 | 3/2002 | Lajara et al. |
| 6,650,545 | B1 * | 11/2003 | Ootori et al. ............... 361/729 |
| 6,671,171 | B1 * | 12/2003 | Homer et al. ............... 361/683 |
| 7,184,273 | B2 * | 2/2007 | Sakai ......................... 361/752 |

FOREIGN PATENT DOCUMENTS

| JP | 408023174 A | * | 1/1996 |
| JP | 02001148578 A | * | 5/2001 |
| JP | 02003110258 A | * | 4/2003 |

* cited by examiner

*Primary Examiner*—Michael Datskovkiy
(74) *Attorney, Agent, or Firm*—Haynes and Boone, LLP (57) ABSTRACT

A chassis reinforcing apparatus includes a chassis defining a component housing. A chassis reinforcing member is coupled to the chassis and comprises a bend which is directed towards the component housing. The bend is designed such that, with components housed in the component housing, the chassis reinforcing member is deflected into a substantially planar orientation.

18 Claims, 6 Drawing Sheets

METHOD AND APPARATUS FOR REINFORCING A CHASSIS

BACKGROUND

The present disclosure relates generally to information handling systems, and more particularly to a method and apparatus for reinforcing an information handling system chassis.

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems are housed in a chassis and may be mounted in racks for storage and/or use. As computing needs continue to grow, the information handling system components housed in the chassis increase in weight, size, and number, which leads to issues with respect to the chassis.

As additional and heavier components are housed in the chassis, the component support surface may begin to sag or bow from the weight of the components, causing the component support surface to deflect from a planar orientation to a bowed orientation. It is desirable to minimize the amount of space taken up by a chassis in the rack in order to mount as many information handling systems in the rack as possible, and the deflection of the component support surface to the bowed orientation may cause the chassis to deflect into space in the rack that is meant to be used by other chassis. Furthermore, the deflection of the component support surface to the bowed orientation creates a perception of low quality due to the systems sagging or bowed appearance.

Typically, the deflection of the component support surface to the bowed orientation is dealt with by stiffening the component support surface by fabricating a thicker component support surface. This is undesirable due to the need to minimize the space taken up in the rack by the chassis and the additional costs incurred in fabricating the thicker component support surface.

Accordingly, it would be desirable to provide a method and apparatus for reinforcing a chassis absent the disadvantages found in the prior methods discussed above.

SUMMARY

According to one embodiment, a chassis reinforcing apparatus is provided which includes a chassis defining a component housing, and a chassis reinforcing member coupled to the chassis and comprising a bend which is directed towards the component housing.

BRIEF DESCRIPTION OF THE DRAWINGS

FIG. 2b is a cross sectional view illustrating an embodiment of the chassis reinforcing member of FIG. 2a.

FIG. 3a is a perspective view illustrating an embodiment of a component support surface used with the chassis reinforcing member of FIG. 2a.

FIG. 3b is a cross sectional view illustrating an embodiment of the component support surface of FIG. 3a.

FIG. 4 is a perspective view illustrating an embodiment of a chassis cover used with the chassis reinforcing member of FIG. 2a and the component support surface of FIG. 3a.

FIG. 5b is a perspective view illustrating an embodiment of the component support surface of FIG. 3a coupled to the chassis reinforcing member of FIG. 2a.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

Figure 1:
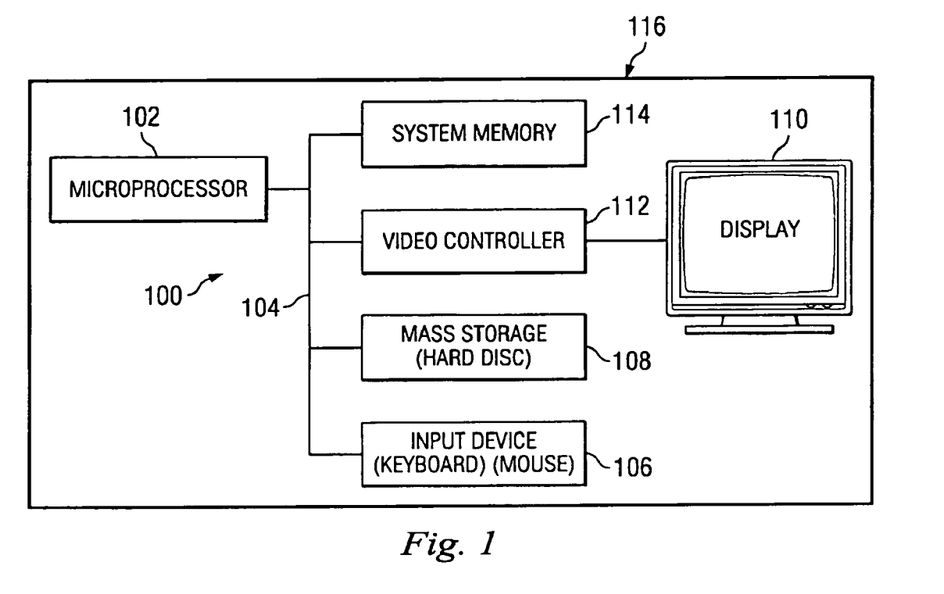
FIG. 1 is a schematic view illustrating an embodiment of an information handling system.

In one embodiment, information handling system 100, FIG. 1, includes a microprocessor 102, which is connected to a bus 104. Bus 104 serves as a connection between microprocessor 102 and other components of computer system 100. An input device 106 is coupled to microprocessor 102 to provide input to microprocessor 102. Examples of input devices include keyboards, touchscreens, and pointing devices such as mouses, trackballs and trackpads. Programs and data are stored on a mass storage device 108, which is coupled to microprocessor 102. Mass storage devices include such devices as hard disks, optical disks, magneto-optical drives, floppy drives and the like. Information handling system 100 further includes a display 110, which is coupled to microprocessor 102 by a video controller 112. A system memory 114 is coupled to microprocessor 102 to provide the microprocessor with fast storage to facilitate execution of computer programs by microprocessor 102. In an embodiment, a chassis 116 houses some or all of the components of information handling system 100. It should be understood that other buses and intermediate circuits can be deployed between the components described above and microprocessor 102 to facilitate interconnection between the components and the microprocessor.

Figure 2A:
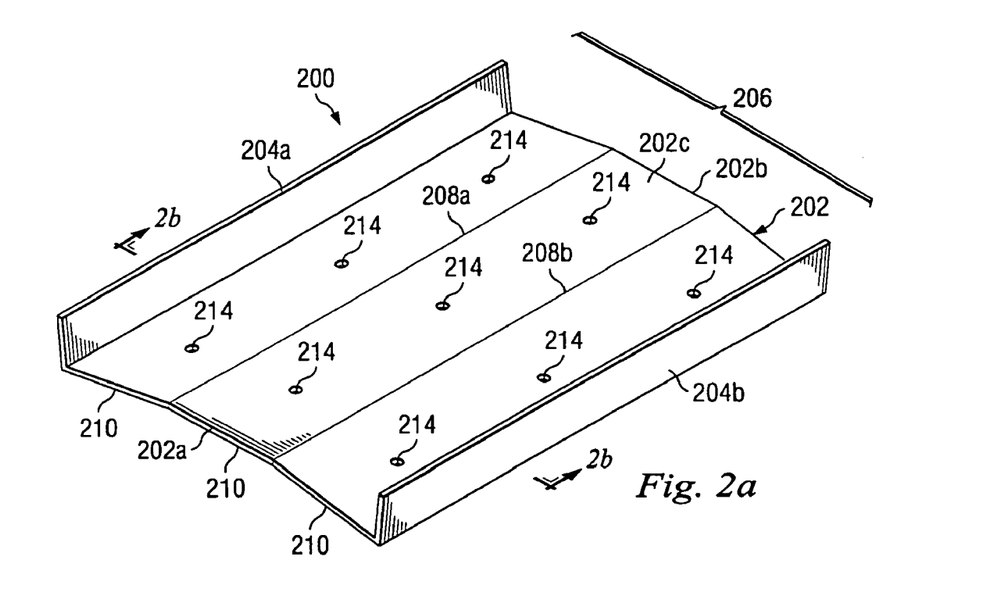
FIG. 2a is a perspective view illustrating an embodiment of a chassis reinforcing member.
Figure 2B:
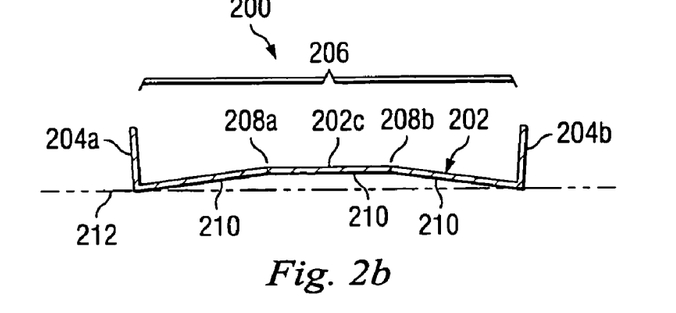

Referring now to FIGS. 2a and 2b, a chassis section 200 is illustrated. The chassis section 200 includes a chassis reinforcing member 202 which includes a front edge 202a, a rear edge 202b located opposite the front edge 202a, a top surface 202c extending between the front edge 202a and the rear edge 202b, and a plurality of side walls 204a and 204 extending from opposite sides of the chassis reinforcing member 202 and between the front edge 202a and the rear edge 202b. A component housing 206 is defined between the chassis reinforcing member 202 and the side walls 204a and 204b. The chassis reinforcing member 202 is fabricated with a plurality of creases 208a and 208b that result in a bend 210 in the chassis reinforcing member 202 which is directed away from a plane 212 and towards the component housing 206, as illustrated in FIG. 2b. A plurality of coupling apertures 214 are defined by the chassis reinforcing member 202 and are located in a spaced apart relationship on the chassis reinforcing member 202. In an embodiment, the chassis section 200 may be fabricated from a conventional sheet metal known in the art.

Figure 3A:
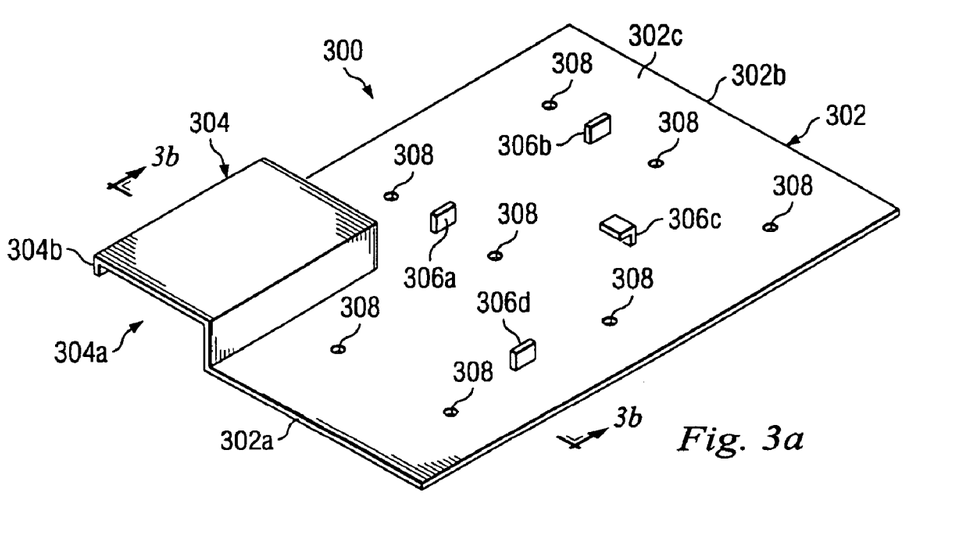
Figure 3B:
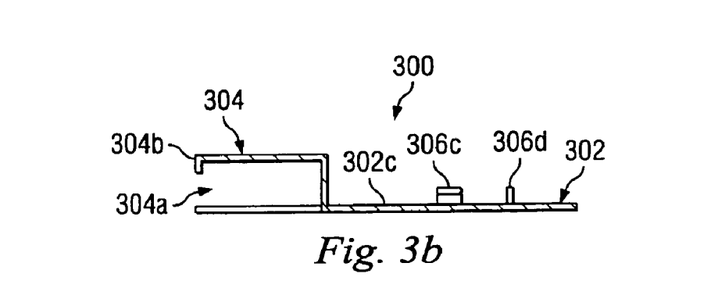

Referring now to FIGS. 3a and 3b, a component support surface 300 is illustrated. The component support surface 300 includes a substantially planar base 302 having a front edge 302a, a rear edge 302b located opposite the front edge 302a, and a top surface 302c extending between the front edge 302a and the rear edge 302b. A component mounting feature 304 extends from the top surface 302c of the base 302 adjacent the front edge 302a, defines a component slot 304a, and includes a side wall mounting section 304b extending from a distal end of the component mounting feature 304. A plurality of component mounting features 306a, 306b, 306c, and 306d extend from the top surface 302c of the base 302 in a spaced apart relationship on the top surface 302c of the component support surface 300. A plurality of coupling apertures 308 are defined by the base 302 and located in a spaced apart relationship on the base 302. In an embodiment, the component support surface 300 is fabricated from a conventional sheet metal known in the art.

Figure 4:
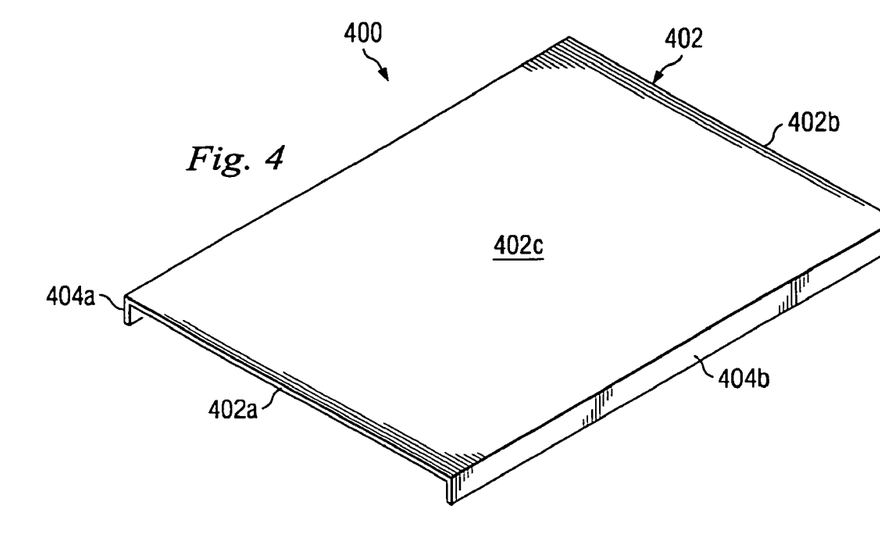

Referring now to FIG. 4, a chassis cover 400 is illustrated. The chassis cover 400 includes a substantially planar base 402 having a front edge 402a, a rear edge 402b located opposite the front edge 402a, a top surface 402c extending between the front edge 402a and the rear edge 402b, and a plurality of side walls 404a and 404b extending from opposite sides of the base 402 and between the front edge 402a and the rear edge 402b. In an exemplary embodiment, the chassis cover 400 is fabricated from a convention sheet metal known in the art.

Referring now to FIGS. 2a, 2b, 3a, 3b, 5a, 5b, and 5c, a method 500 for reinforcing a chassis is illustrated. The method 500 begins at step 502 where a chassis is provided. The component support surface 300 is positioned in the component housing 206 on the chassis section 200 such that the front edge 302a of the component support surface 300 is adjacent the front edge 202a of the chassis reinforcing member 202 and the rear edge 302b on the component support surface 300 is adjacent the rear edge 202b on the chassis reinforcing member 202. Positioning the component support surface 300 in the component housing 206 on the chassis section 200 provides a chassis 502a. In an embodiment, the chassis 502a may be the chassis 116, described above with reference to FIG. 1.

Figure 5A:
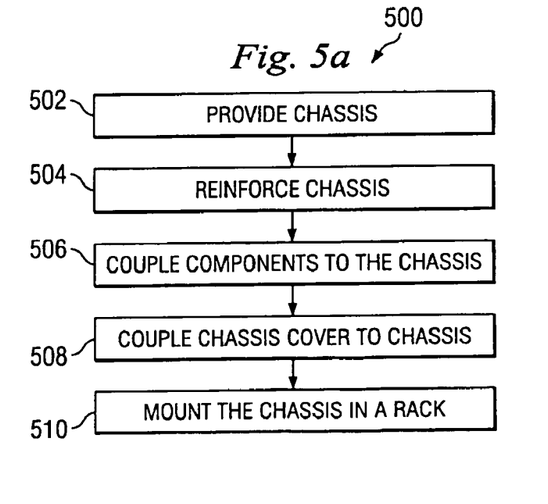
FIG. 5a is a flow chart illustrating an embodiment of a method for reinforcing a chassis.
Figure 5B:
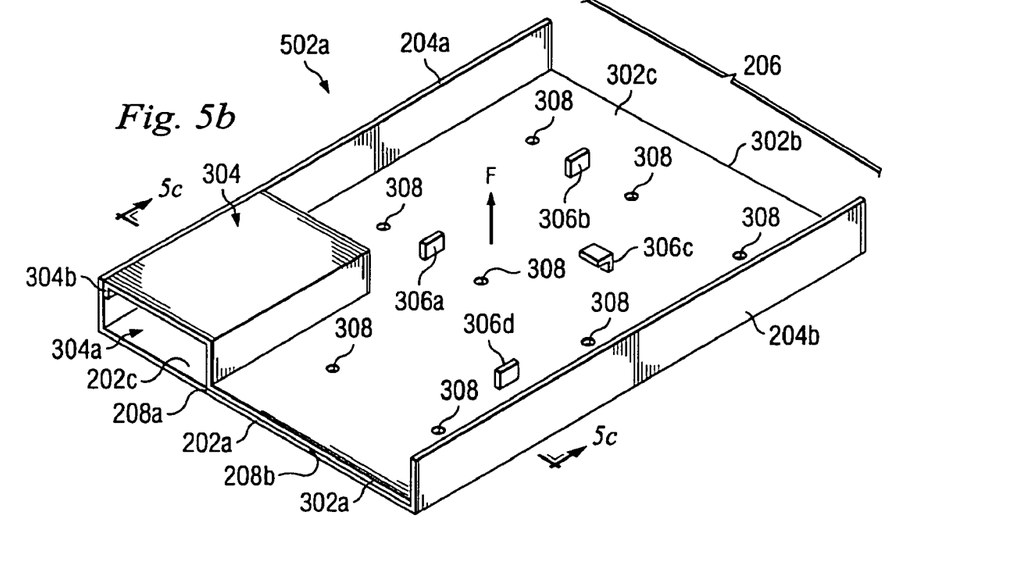

Referring now to FIGS. 2a, 2b, 3a, 3b, 5a, 5b, and 5c, the method 500 then proceeds to step 504 where the chassis 502a is reinforced. The component support surface 300 is coupled to the chassis reinforcing member 202 using methods known in the art such as, for example, rolling the edge of the coupling apertures 214 on the chassis reinforcing member 202 over the edge of the coupling apertures 308 on the component support surface 300, positioning rivets through the coupling apertures 214 and 308 on the chassis reinforcing member 202 and the component support surface 300, respectively, welding the component support surface 300 to the chassis reinforcing member 202, combinations thereof, or a variety of other methods known in the art. In an embodiment, any apertures in the chassis 502a may be shielded to prevent electromagnetic interference to and from components in the chassis 502a. Furthermore, the side wall mounting section 304b on the component support surface 300 is coupled to the side wall 204a on the chassis section 200. By coupling the component support surface 300 to the chassis section 200, the chassis reinforcing member 202 is held in a substantially planar orientation by the component support surface 300, as illustrated in FIGS. 5a and 5b. As a result of holding the chassis reinforcing member 202 in a substantially planar orientation, the bend 210 in the chassis reinforcing member 202 is flattened out, which creates a reinforcing force F from the chassis reinforcing member 202 which is directed towards the component housing 206 and creates a stress in the component support surface 300 directed towards the component housing 206, as illustrated in FIGS. 5a and 5b.

Figure 5C:
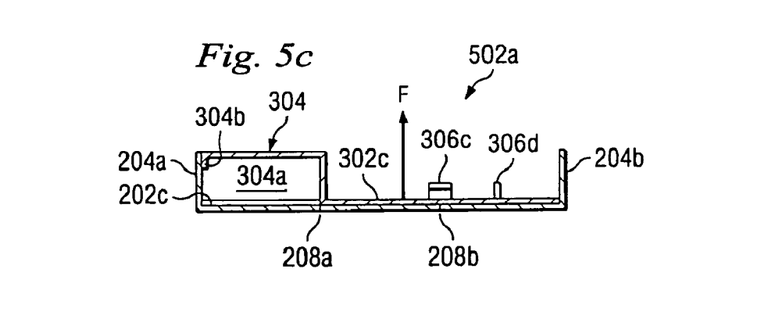
FIG. 5c is a cross sectional view illustrating an embodiment of the component support surface and the chassis reinforcing member of FIG. 5b.
Figure 5D:
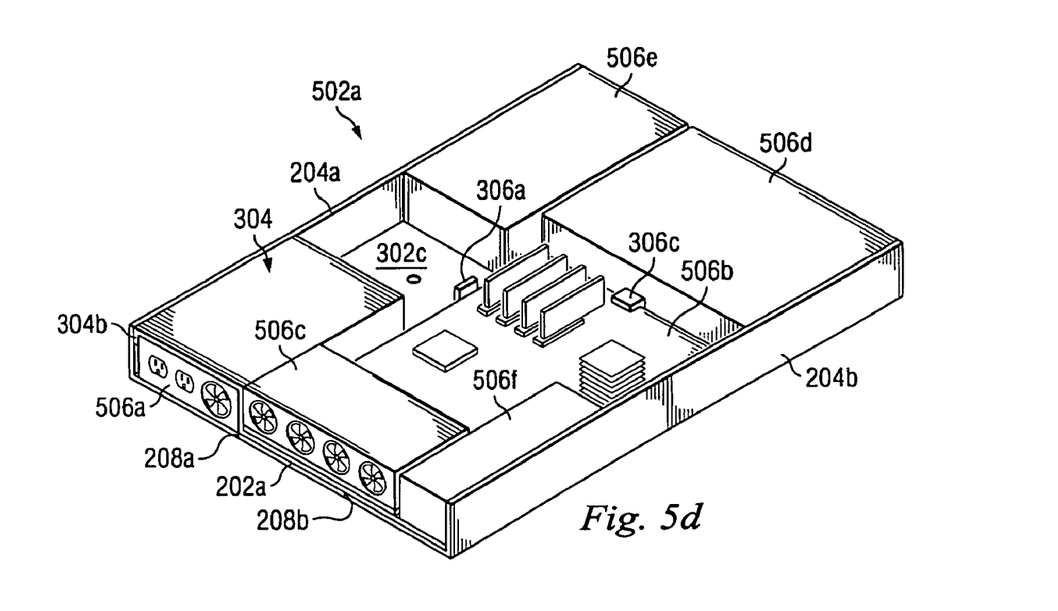
FIG. 5d is a perspective view illustrating an embodiment of a plurality of components positioned in the component support surface and the chassis reinforcing member of FIG. 5b.

Referring now to FIGS. 2a, 2b, 3a, 3b, 5a, 5b, 5c, and 5d, the method 500 proceeds to step 506 where components are coupled to the chassis 502a. A power supply component 506a is coupled to the chassis 502a by positioning it in the component slot 304a. A motherboard component 506b is coupled to the chassis 502a by positioning it between the component mounting features 306a, 306c and 306d, and a fan component 506c is coupled to the chassis 502a by mounting it to the motherboard component 506b. A disk drive component 506d is coupled to the chassis 502a by positioning it between the component mounting features 306b and 306c, and a plurality of other components 506e and 506f are coupled to the chassis 502a using methods known in the art. In an embodiment, the components 506a, 506b, 506c, 506d, 506e, and 506f may be components of the information handling system 100, described above with reference to FIG. 1. In an embodiment, the bend 210 in chassis reinforcing member 202 is designed such that, with the components 506a, 506b, 506c, 506d, 506e, and 506f coupled to the chassis 502a, the force F provided by the chassis reinforcing member 202 counteracts the weight of the components 506a, 506b, 506c, 506d, 506e, and 506f and the component support surface 300 and the chassis reinforcing member 202 are oriented in a substantially planar orientation, as illustrated in FIG. 5c.

Figure 5E:
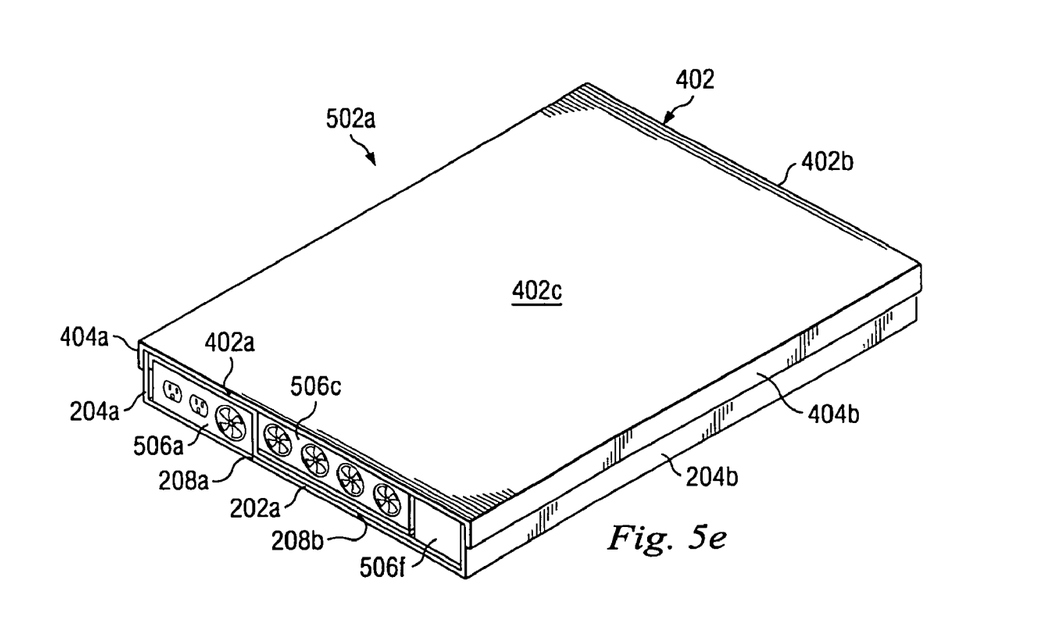
FIG. 5e is a perspective view illustrating an embodiment of the chassis cover of FIG. 4 coupled to the component support surface and the chassis reinforcing member of FIG. 5d.

Referring now to FIGS. 4, 5a, 5d, and 5e, the method 500 proceeds to step 508 where the chassis cover 400 is coupled to the chassis 502a. The chassis cover 400 is positioned adjacent the chassis 502a such that the front edge 402a on the chassis cover 400 is adjacent the front edge 202a of the chassis reinforcing member 202 and the rear edge 402b of the chassis cover 400 is adjacent the rear edge 202b of the chassis reinforcing member 202. The side walls 404a and 404b on the chassis cover 400 may then be coupled to the side walls 204a and 204b, respectively, on the chassis section 200, as illustrated in FIG. 5e, using methods known in the art.

Figure 5F:
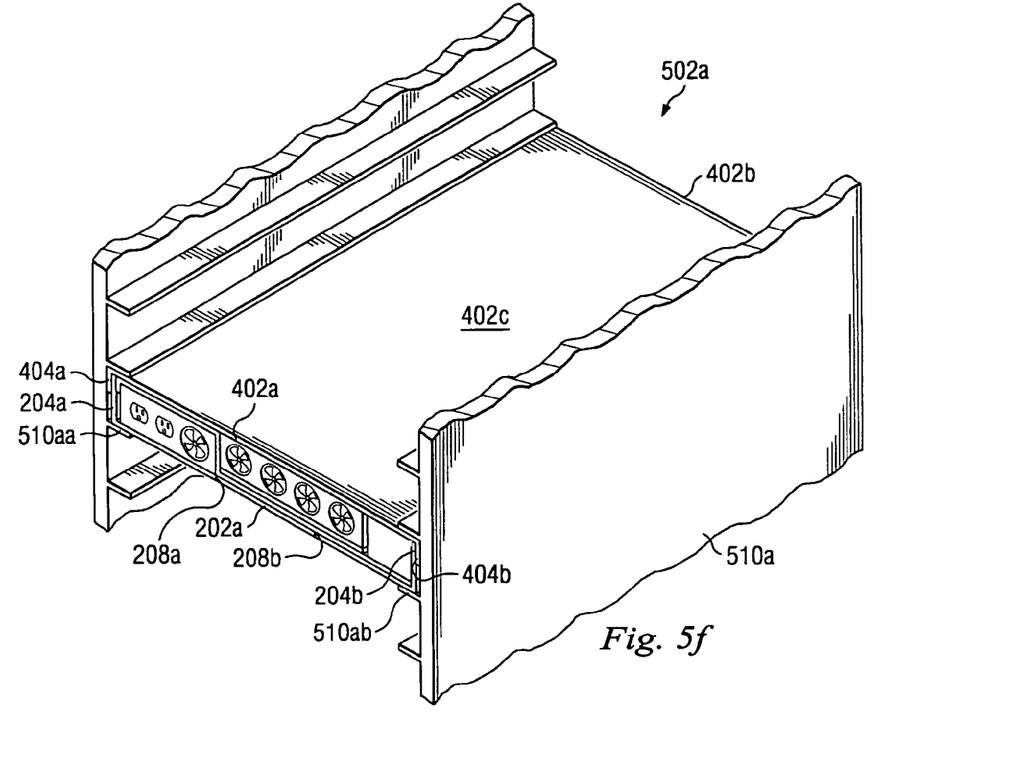
FIG. 5f is a perspective view illustrating an embodiment of the chassis cover, the component support surface, and the chassis reinforcing member of FIG. 5d mounted to a rack.

Referring now to FIGS. 5a, 5b, 5d, 5e, and 5f, the method 500 proceeds to step 510 where the chassis 502a is mounted in a rack. A rack 510a including a plurality of spaced apart supports 510aa and 510ab is provided. The chassis 502a may then be mounted in the rack 510a by engaging the sides of the chassis section 200 which are adjacent each of the side walls 204a and 204b with the supports 510aa and 510ab, respectively. With the chassis 502a mounted in the rack 510a, the chassis reinforcing member 202 remains in a substantially planar orientation and substantially parallel to the chassis cover 400, as illustrated in FIG. 5f. The bend 210 in the chassis reinforcing member 202 prevents the chassis 502a from sagging or bowing between the supports 510aa and 510ab due to the weight of the components 506a, 506b, 506c, 506d, 506e, and 506f in the component housing 206, which results in the chassis 502a taking up minimal space in the rack rather than sagging or bowing into a space reserved for another chassis, and provides an appearance of chassis strength and quality due to the chassis 502a holding its structure when mounted between the supports 510aa and 510ab in rack 510a. While the component support surface 300 has been illustrated as a chassis floor, the chassis support surface 300 and chassis reinforcing member 202 may be located in different positions and orientation on the chassis 502a where additional support is needed.

Figure 6:
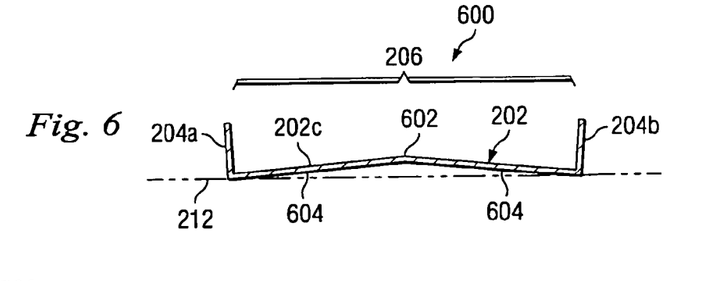
FIG. 6 is a cross sectional view illustrating an alternative embodiment of a chassis reinforcing member.

Referring now to FIG. 6, in an alternative embodiment, a chassis section 600 is substantially similar in design and operation to the chassis section 200, described above with reference to FIGS. 2a, 2b, 3a, 3b, 4, 5a, 5b, 5c, 5d, 5e, and 5f, with the provision of a modified crease 602 and a modified bend 604 replacing the creases 208a and 208b and the bend 210. The crease 602 is centrally located on the chassis reinforcing member 202 and results in the bend 604 in the chassis reinforcing member 202 which is directed away from the plane 212 and towards the component housing 206, as illustrated in FIG. 6. In an embodiment, the crease 602 and bend 604 in the chassis section 600 may be modified to provide different reinforcing forces for different component and weight distributions in the chassis.

Figure 7:
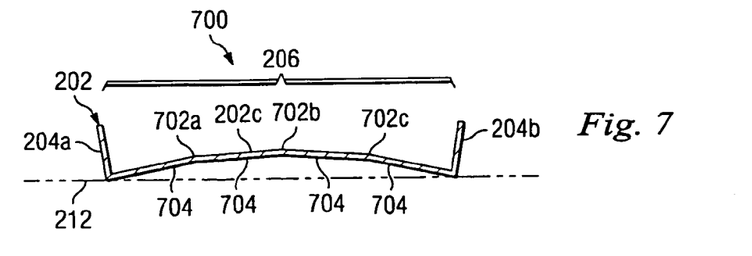
FIG. 7 is a cross sectional view illustrating an alternative embodiment of a chassis reinforcing member.

Referring now to FIG. 7, in an alternative embodiment, a chassis section 700 is substantially similar in design and operation to the chassis section 200, described above with reference to FIGS. 2a, 2b, 3a, 3b, 4, 5a, 5b, 5c, 5d, 5e, and 5f, with the provision of a plurality of modified creases 702a, 702b, and 702c and a modified bend 704 replacing the creases 208a and 208b and the bend 210. The creases 702a, 702b, and 702c are located on the chassis reinforcing member 202 in a spaced apart and substantially parallel relationship and result in the bend 704 in the chassis reinforcing member 202 which is directed away from the plane 212 and towards the component housing 206, as illustrated in FIG. 7. In an embodiment, the creases 702a, 702b, and 702c and bend 704 in the chassis section 700 may be modified to provide different reinforcing forces for different component and weight distributions in the chassis.

Figure 8:
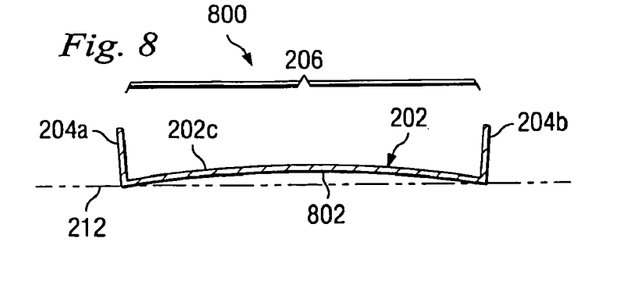
FIG. 8 is a cross sectional view illustrating an alternative embodiment of a chassis reinforcing member.

Referring now to FIG. 8, in an alternative embodiment, a chassis section 800 is substantially similar in design and operation to the chassis section 200, described above with reference to FIGS. 2a, 2b, 3a, 3b, 4, 5a, 5b, 5c, 5d, 5e, and 5f, with the provision of a modified bend 802 replacing the creases 208a and 208b and the bend 210. The bend 704 creates an arcuate section of the chassis reinforcing member 202 between the side walls 204a and 204b which is directed away from the plane 212 and towards the component housing 206, as illustrated in FIG. 8. In an embodiment, the bend 804 in the chassis section 800 may be modified to provide different reinforcing forces for different component and weight distributions in the chassis.

Figure 9:
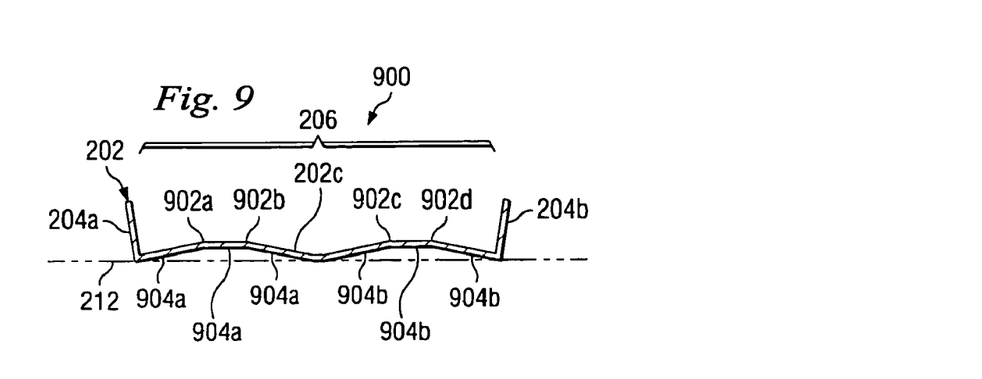
FIG. 9 is a cross sectional view illustrating an alternative embodiment of a chassis reinforcing member.

Referring now to FIG. 9, in an alternative embodiment, a chassis section 900 is substantially similar in design and operation to the chassis section 200, described above with reference to FIGS. 2a, 2b, 3a, 3b, 4, 5a, 5b, 5c, 5d, 5e, and 5f, with the provision of a plurality of modified creases 902a, 902b, 902c, and 902d and a plurality of modified bends 904a and 904b replacing the creases 208a and 208b and the bend 210. The creases 902a, 902b, 902c, and 902d are located on the chassis reinforcing member 202 in a spaced apart and substantially parallel relationship and result in the plurality of bends 904a and 904b in the chassis reinforcing member 202 which are spaced apart and substantially parallel and are directed away from the plane 212 and towards the component housing 206, as illustrated in FIG. 9. In an embodiment, the creases 902a, 902b, 902c, and 902d and bends 904a and 904b in the chassis section 900 may be modified to provide different reinforcing forces for different component and weight distributions in the chassis.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A chassis reinforcing apparatus, comprising:
   a chassis defining a component housing; and
   a chassis reinforcing member coupled to the chassis and comprising a bend which is directed towards the component housing, wherein the bend is designed such that the chassis reinforcing member is deflected into a substantially planar orientation when a plurality of components are positioned in the component housing.

2. The apparatus of claim 1, wherein the bend is operable to provide a reinforcing force directed towards the component housing.

3. A chassis reinforcing apparatus, comprising:
   a chassis defining a component housing;
   a chassis reinforcing member coupled to the chassis and comprising a bend which is directed towards the component housing; and
   a component support surface coupled to the chassis reinforcing member.

4. The apparatus of claim 3, wherein the component support surface holds the chassis reinforcing member in a substantially planar orientation.

5. The apparatus of claim 3, wherein the component support surface is a chassis floor, whereby the bend provides a stress in the chassis floor directed towards the component housing.

6. The apparatus of claim 3, further comprising:
a chassis cover coupled to the chassis; and
a plurality of components positioned in the component housing.

7. The apparatus of claim 6, wherein with the plurality of components positioned in the component housing the chassis reinforcing member is oriented in a substantially planar orientation.

8. The apparatus of claim 6, further comprising:
a rack, whereby the chassis is mounted in the rack and the chassis cover and the chassis reinforcing member are oriented substantially parallel to each other.

9. An information handling system, comprising:
a chassis defining a component housing;
a microprocessor coupled to the chassis and positioned in the component housing;
a plurality of information handling system components positioned in the component housing; and
a chassis reinforcing member coupled to the chassis and comprising a bend which is directed towards the component housing, wherein the bend is designed such that the chassis reinforcing member is deflected into a substantially planar orientation with the information handling system components positioned in the component housing.

10. The system of claim 9, wherein the bend provides a reinforcing force directed towards the information handling system components and the component housing.

11. An information handling system, comprising:
a chassis defining a component housing;
a microprocessor coupled to the chassis and positioned in the component housing;
a plurality of information handling system components positioned in the component housing;
a chassis reinforcing member coupled to the chassis and comprising a bend which is directed towards the component housing; and
a component support surface coupled to the chassis reinforcing member.

12. An information handling system, comprising:
a chassis defining a component housing;
a microprocessor coupled to the chassis and positioned in the component housing;
a plurality of information handling system components positioned in the component housing; and
a chassis reinforcing member coupled to the chassis and comprising a bend which is directed towards the component housing, wherein the component support surface holds the chassis reinforcing member in a substantially planar orientation.

13. An information handling system, comprising:
a chassis defining a component housing;
a microprocessor coupled to the chassis and positioned in the component housing;
a plurality of information handling system components positioned in the component housing; and
a chassis reinforcing member coupled to the chassis and comprising a bend which is directed towards the component housing, wherein the component support surface is a chassis floor, whereby the bend provides a stress in the chassis floor directed towards the information handling system components and the component housing.

14. The system of claim 13, further comprising:
a chassis cover coupled to the chassis.

15. The system of claim 14, further comprising:
a rack, whereby the chassis is mounted in the rack and the chassis cover and the chassis reinforcing member are oriented substantially parallel to each other.

16. A method for reinforcing a chassis, comprising:
providing a chassis defining a component housing and including a chassis support surface; and
reinforcing the chassis by creating a stress in the chassis support surface which is directed towards the component housing.

17. The method of claim 16, wherein the reinforcing comprises creating a stress by coupling a chassis reinforcing member to the chassis support surface, the chassis reinforcing member comprising a bend which is directed towards the component housing.

18. The method of claim 16, further comprising:
coupling a plurality of information handling system components to the chassis;
coupling a chassis cover to the chassis; and
mounting the chassis to a rack, whereby the chassis cover and the chassis reinforcing member are oriented substantially parallel to each other.

* * * * *